United States Patent [19]
Mandula, Jr. et al.

[11] 3,746,972
[45] July 17, 1973

[54] BILLET SCANNING MECHANISM USING A PROBE CARRYING DRUM ROTATABLE ABOUT THE BILLET AND PIVOTABLY MOUNTED RELATIVE THERETO

[75] Inventors: Joseph M. Mandula, Jr., Seven Hills; John B. Fox, Shaker Heights; John K. Bricker, Cleveland Heights, all of Ohio

[73] Assignee: Republic Steel Corporation, Cleveland, Ohio

[22] Filed: Feb. 16, 1970

[21] Appl. No.: 11,467

[52] U.S. Cl. ................................................ 324/37
[51] Int. Cl. ............................................. G01r 33/12
[58] Field of Search ............. 324/37, 40; 73/67.8, 73/67.8 S

[56] References Cited
UNITED STATES PATENTS

| | | | |
|---|---|---|---|
| 2,998,800 | 9/1961 | Vernooy | 324/64 |
| 3,582,771 | 6/1971 | Placke | 324/37 |
| 3,066,254 | 11/1962 | Price et al. | 324/37 |
| 3,170,114 | 2/1965 | Placke | 324/37 |
| 3,534,258 | 10/1970 | Forster | 324/37 |
| 3,299,350 | 1/1967 | Tompkins et al. | 324/37 |
| 3,418,567 | 12/1968 | Mandula et al. | 324/37 |

Primary Examiner—Robert J. Corcoran
Attorney—Robert P. Wright and Joseph W. Malleck

[57] ABSTRACT

Method and apparatus for scanning a workpiece such as a billet. A rotating drum is utilized to mount one or more probe mechanisms to scan a workpiece that is passed through the drum. A frame assembly mounts the drum for rotation therein and is pivotally mounted. Guide rollers carried by the frame assembly bear against the workpiece and position the drum with respect to the workpiece. The frame assembly is also movable in a direction transverse to the pivotal axis of the frame assembly. The pivotal and transverse frame assembly movement permits the workpiece to be tracked. The rotating drum includes one or more self-contained fluid-acting mechanisms, such as a paint marking device and a pneumatic compressor. Only electrical connections pass between the relatively fixed frame assembly and the rotating drum. Fluid connections between these parts are not required simplifying the assembly.

12 Claims, 14 Drawing Figures

BILLET SCANNING MECHANISM USING A PROBE CARRYING DRUM ROTATABLE ABOUT THE BILLET AND PIVOTABLY MOUNTED RELATIVE THERETO

BACKGROUND AND BRIEF DESCRIPTION OF THE INVENTION

This invention relates to testing methods and apparatus. More particularly it is directed to the testing of a workpiece utilizing one or more probe mechanisms that travel about the periphery of the workpiece in order to scan the workpiece. The invention is concerned with providing suitable mountings for such probe mechanisms.

Co-pending application Ser. No. 829,872, filed June 3, 1969, entitled "Probe Carrying Apparatus" and assigned to the assignee of the present application, discloses a carrier assembly for mounting a probe in a testing position with respect to a workpiece under test, such as a billet. The probe is carried around and in contact with the surface of the workpiece. The present invention particularly is suitable for mounting one or more probe carrier assemblies such as shown in this co-pending application. Broadly, however, the present invention is applicable to the mounting of any type of probe which is to be carried about a workpiece under test.

The present invention utilizes a drum to which is mounted one or more probe mechanisms. The drum is mounted for rotation in a frame assembly. The frame assembly is pivotable to permit the rotating drum to "track" a workpiece under test. To this end guide rolls are utilized, mounted to the frame assembly, which bear against the workpiece and position the frame assembly, and concomitantly the rotating drum, properly with respect to the workpiece. The frame assembly is typically pivotable about a straight line axis, and is also made movable in a direction transverse to that axis as, for example, by mounting the frame assembly on a carriage unit structure which slides along a track. The transverse and pivotal movements of the frame assembly permit complete tracking of the workpiece under test, regardless of changes in the position or shape of the workpiece.

The rotating drum includes one or more self-contained fluid-acting mechanisms. For example, one or more paint marking devices may be carried on the drum to mark the workpiece to provide an indication of flaws in the workpiece. Since the fluid-acting mechanisms are self-contained, no fluid coupling need be provided between the rotating drum and the frame assembly which is fixed relative to the rotating drum. Only electrical connections need be provided between the frame assembly and rotating drum to provide suitable power for the self-contained fluid-acting mechanisms. This mounting arrangement for the self-contained fluid-acting mechanisms greatly simplifies the construction of apparatus embodying the invention and operation of that apparatus.

BRIEF DESCRIPTION OF THE DRAWINGS

The drawings illustrate apparatus embodying the invention and set forth the best mode of carrying out the invention.

DETAILED DESCRIPTION

Figures 1, 1A:
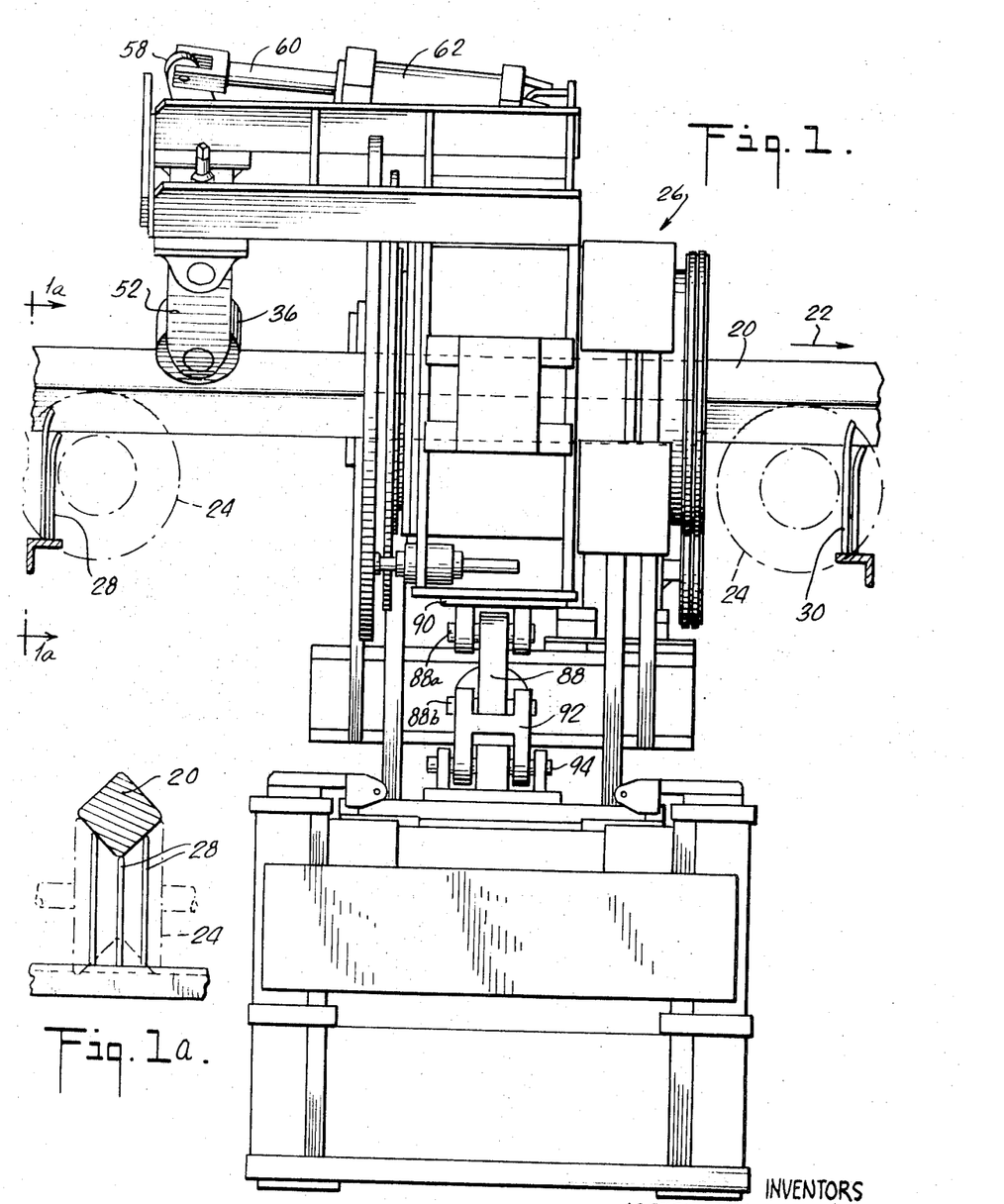
FIG. 1 is a side view of apparatus embodying the invention.
FIG. 1a is a sectional view taken along section line 1a—1a in FIG. 1.

Referring to FIG. 1, a workpiece under inspection, such as a billet 20, is moved in the direction of arrow 22. Rollers 24 provide support for the billet and permit its movement (see FIG. 1a). The billet moves through a testing assembly designated generally as 26. Sensing devices 28 and 30 are respectively positioned adjacent the entrance and exit ends of the testing assembly. These sensing devices are for the purpose of sensing the presence of the workpiece. In the case of a metallic workpiece, the sensing devices may simply constitute a plurality of wires (see also FIG. 1a) which make electrical contact with the workpiece and complete an electric circuit when contact is made. Other sensing devices are suitable; for example, photocell sensing techniques may be employed.

Figures 2, 2A:
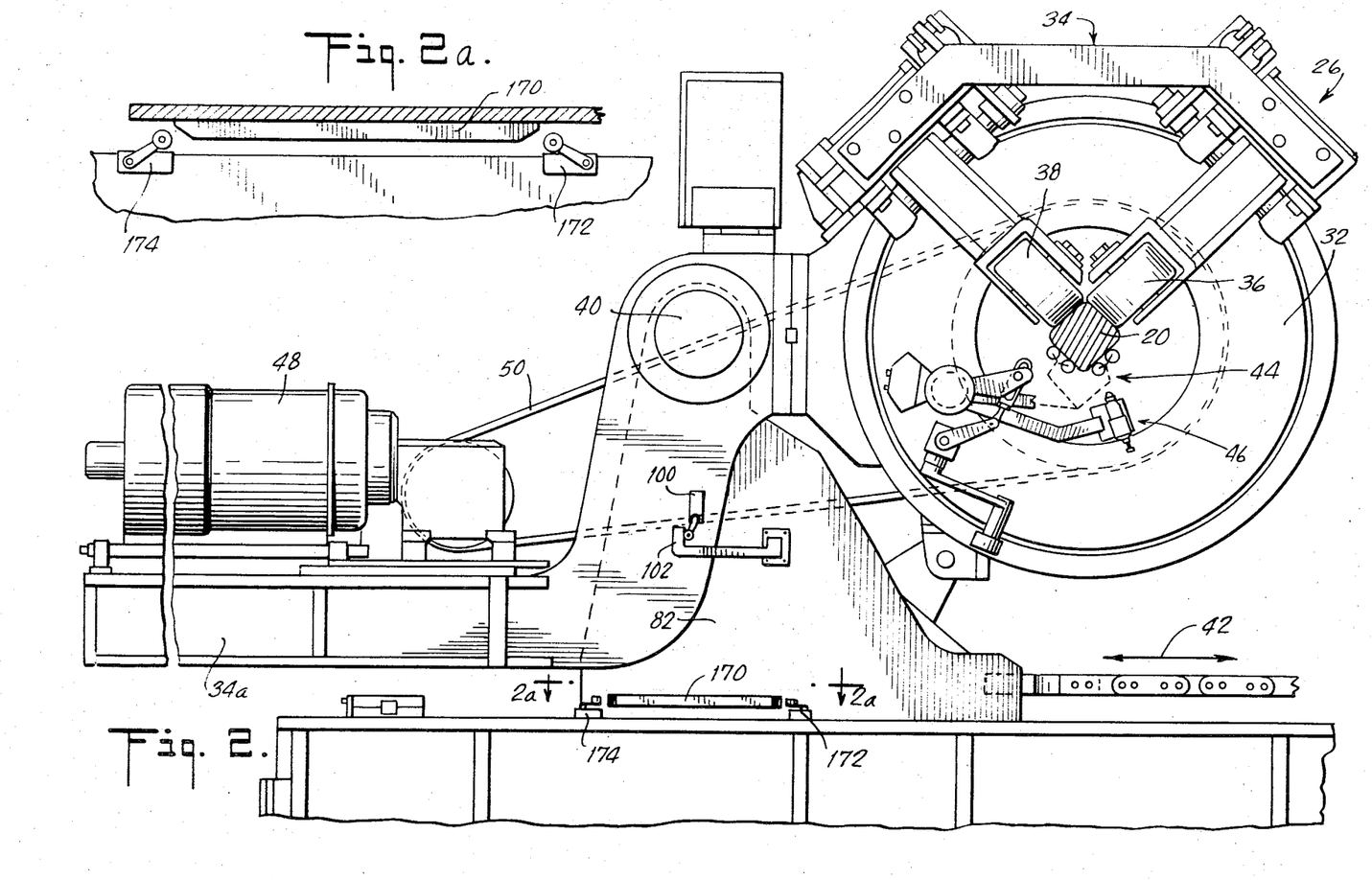
FIG. 2 is a front view of the apparatus shown in FIG. 1.
FIG. 2a is a sectional view taken along the section line 2a—2a in FIG. 2.

Referring to FIG. 2, the testing assembly 26 comprises a drum 32, which is mounted for rotation in a frame assembly designated generally as 34. The frame assembly includes a pair of guide rollers 36 and 38 that bear against the workpiece 20 in an operating position of the testing assembly 26. These guide rollers position the frame assembly 34 and hence the drum 32 with respect to the workpiece. The frame assembly 34 is pivotally mounted with respect to an axis 40. The frame assembly is also mounted for movement back and forth in the direction of arrow 42 which is transverse to the direction of the pivot axis 40. This pivoting and transverse movement of the frame assembly permits the workpiece to be "tracked" by the testing assembly 26, regardless of changes in position or shape of the workpiece.

As shown in FIG. 2, the drum 32 carries a probe mechanism designated generally as 44. This probe mechanism may be the same as that disclosed in the copending application referred to above. The probe mechanism travels about the periphery of the workpiece 20 as the drum 32 is rotated, scanning the workpiece and developing suitable signals useful in the detection of flaws within the workpiece. A paint marking device 46 is also carried on the drum 32 and is actuated to mark the workpiece whenever a flaw is detected.

The frame assembly 34 includes a rear extension 34a providing support for a motor 48. The motor 48 drives the drum 32 by means of belt 50. The weight of the frame assembly extension 34a and the motor 48 is such as to counterbalance the weight of the frame assembly and drum on the opposite side of the pivot axis 40, so that relatively little force is needed to pivot the frame assembly about the pivot axis.

As will be explained in more detail below, the rotating drum 32 is provided only with electrical connections between it and the relatively fixed frame assembly 34, even though the rotating drum includes a plurality of fluid-acting mechanisms thereon, such as the paint marking device 46. This is achieved by making the fluid-acting mechanisms self-contained, so that the only communication that need be made with the drum is an electrical communication. In this fashion the construction of the entire testing assembly is simplified and the need for complex fluid- communication between the rotating drum 32 and the relatively fixed frame assembly 34 is obviated.

The individual details of the testing assembly will now be described in more detail.

Guide Rollers 36 and 38

Figure 7:
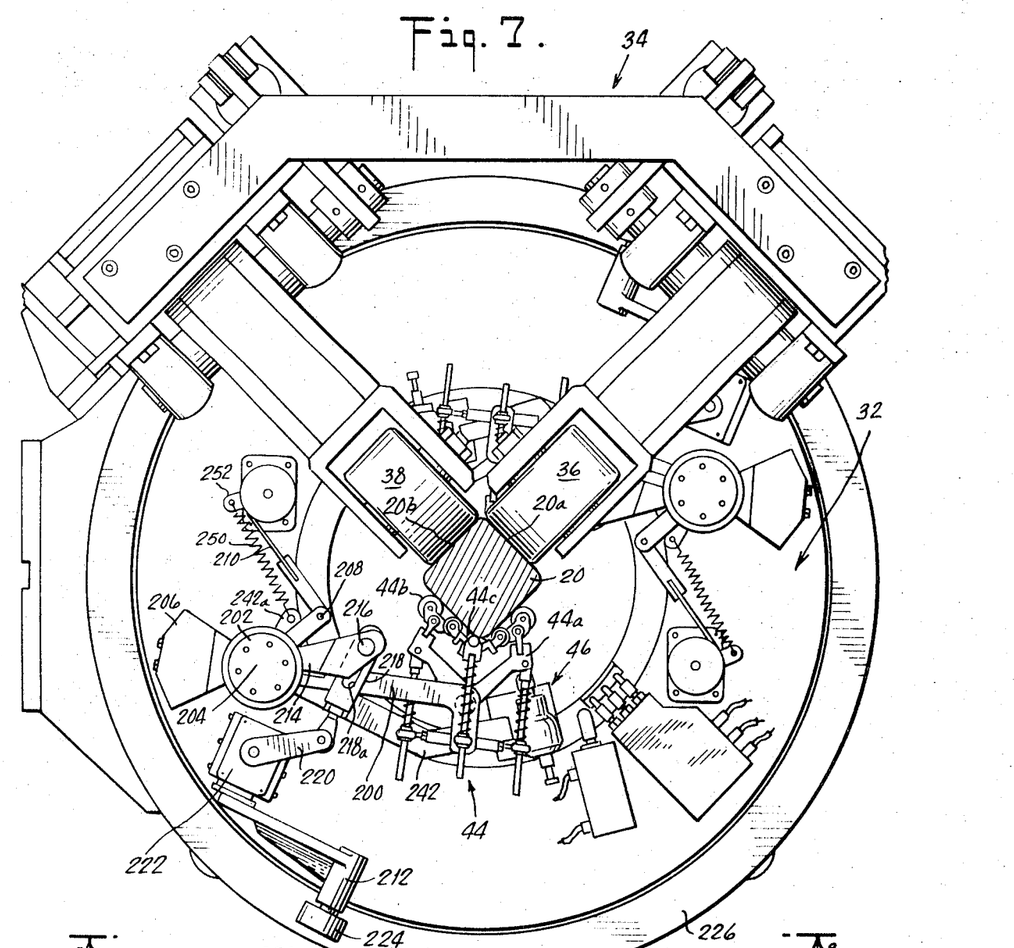
FIG. 7 is an enlarged view of part of the apparatus of FIG. 2, showing the details of a probe-carrying assembly mounted to the rotating drum.
Figure 9:
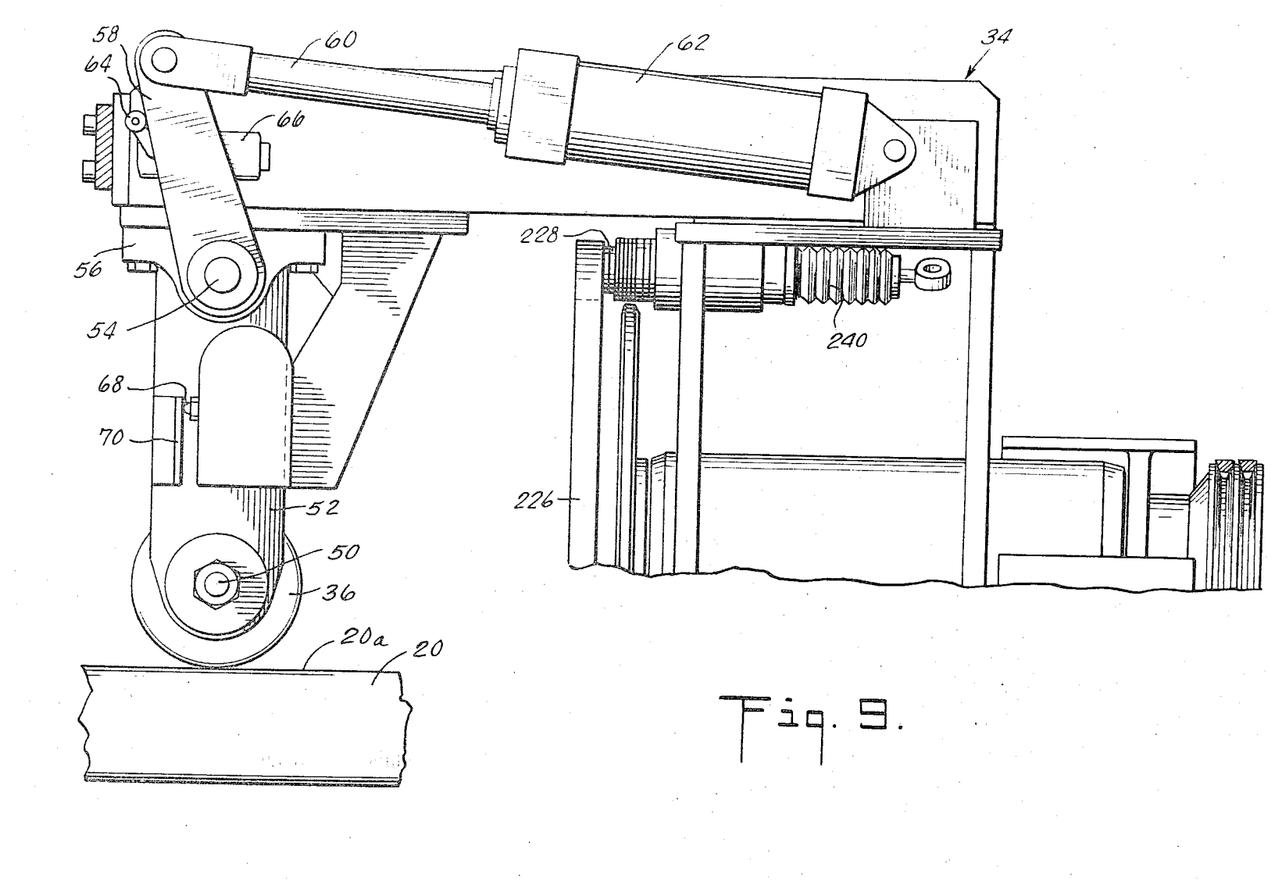
FIG. 9 is a view, to an enlarged scale, of part of the apparatus of FIG. 1, showing the details of the guide rollers used to position the frame assembly with respect to a workpiece under test.

The guide rollers 36 and 38 position the frame assembly 26 and hence the drum 32 with respect to the workpiece 20. As shown in FIGS. 2 and 7 (FIG. 7 is essentially the same as FIG. 2, to an enlarged scale and showing more detail than FIG. 2) the guide rollers 36 and 38 are positioned against adjacent faces 20a and 20b of the billet under inspection (see FIG. 7 in particular). The details of the guide roller mechanism pertaining to the guide roller 36 are shown in FIG. 9. The mechanism for controlling the guide roller 38 is the same. Referring to FIG. 9, the guide roller 36 is mounted for free rotation about an axle 50 that is carried by an arm 52. The arm 52 is attached to a second axle 54 that is mounted for rotation within frame piece 56. Also attached to the axle 54 is a second arm 58 which is actuated by a piston rod 60. Movement of the piston rod 60 is controlled by a fluid cylinder 62 which is mounted to the frame assembly 34. Movement of the piston rod 60 to the right in FIG. 9 results in movement of the guide roller 36 upwardly and to the left in FIG. 9, i.e., clockwise about the axle 54 as an axis. In the operating position of the guide roller 36 against the billet 20, the arm 58 actuates a roller 64 that is part of a limit switch 66. Thus in the "operating" position of the guide roller, the limit switch 66 may be utilized to provide a suitable signal for a control mechanism. The movement of the guide roller 36 about the axis of the axle 54 is limited by a stop 68 which is contacted by a stop plate 70 carried by the arm 52 which in turn carries the guide roller 36.

In operation of the mechanism, the guide roller 36 is normally maintained in a "non-operating" position (the piston rod 60 is moved to the right with respect to the position shown in FIG. 9). Whenever billet inspection is to take palce, the piston rod 60 is moved to the left in FIG. 9, lowering the guide roller 36 until it is in contact with the billet 20. The guide roller 36 rides on the surface 20a of the billet and positions the frame assembly 34, and hence the rotating drum 32, with respect to the billet. Any variations in contour of the billet have no effect on the positioning of the drum 32 with respect to the billet by virtue of the tracking of the billet occasioned by the guide rollers 36 and 38.

Pivoting of Frame Assembly 34 about Axis 40

Figure 6:
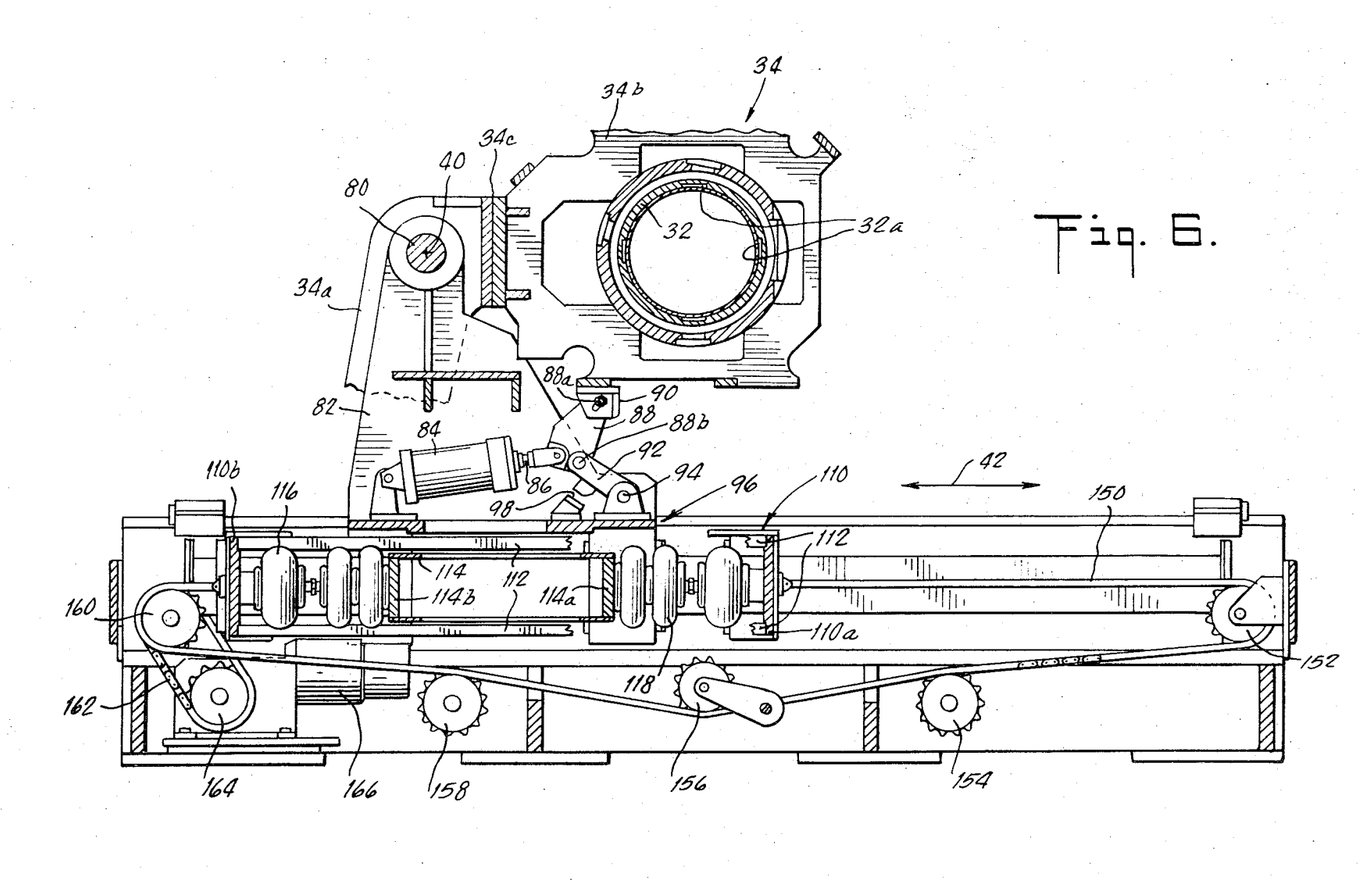
FIG. 6 is a front view similar to that of FIG. 2, broken away and partly in section, showing details not visible in FIG. 2.

The frame assembly 34 pivots about the axis 40, as noted above, to aid in the tracking of the workpiece 20 under inspection, i.e., to aid in the positioning of the rotating drum 32 with respect to the workpiece. FIG. 6 shows the details of the pivotal arrangements. An axle or shaft 80 is provided, which is carried by frame member 82 that is mounted on a carriage unit 96 for movement in the direction of arrow 42, to be described below. The frame assembly 34 includes the rear portion 34a described above in connection with FIG. 2, and a front portion 34b. The front and rear portions are bolted together as at the joint 34c. The shaft 80 provides for pivotal movement of the entire frame assembly 34 about the axis 40.

Pivotal movement of the frame assembly 34 is controlled by a fluid cylinder 84 which provides for actuation of a piston 86. The piston 86 is coupled to an arm 88 that is pivotally connected by shaft 88a to member 90 attached to the front portion 34b of the frame assembly 34. The arm 88 is also pivotally connected by shaft 88b to a second arm 92 that pivots about a shaft 94 carried on the carriage unit. When the piston 86 is moved to the right in FIG. 6, the arms 88 and 92 align themselves and the frame assembly 34 is caused to pivot about the axis 40 in a counterclockwise sense. When the piston 86 is moved to the left in FIG. 6, the frame assembly 34 is caused to pivot in a clockwise sense about the axis 40. A stop 98 limits the downward (most clockwise) position of the frame assembly 34. In the uppermost (most counterclockwise) position of the frame assembly 34, the arms 88 and 92 are positioned so that the shafts 88a, 88b and 94 are not quite in a straight line. In particular, a line joining the shafts 88a and 88b makes a concave angle with a line joining the shafts 88b and 94 (concave facing toward the piston 86). In this fashion, when the frame assembly 34 is in its uppermost position, there is no danger of the frame assembly falling downwardly (pivoting clockwise) possibly endangering personnel, in the event that pressure is inadvertently removed from the cylinder 84.

In operation, the piston 86 is typically retained in its rightmost position in FIG. 6, causing the frame assembly 34 to be at its uppermost (most counterclockwise) position. When a billet is to be inspected, the piston 86 is moved to the left in FIG. 6, until the guide rollers 36 and 38 contact the billet 20 and prevent further clockwise movement of the frame assembly. The piston 86 is given a slight bias to the left in FIG. 6 to insure that the rollers 36 and 38 maintain contact with the billet 20 so that the rollers continuously contact the billet.

In the operating position of the frame assembly 34 (see FIG. 2), when the guide rollers 36 and 38 are tracking the billet, a limit switch 100, carried by the rear portion 34a of the frame assembly 34, is actuated by contact with an arm 102 carried upon frame member 82. The limit switch 100 may be used for suitable control purposes.

Transverse Movement of the Frame Assembly 34

Figure 3:
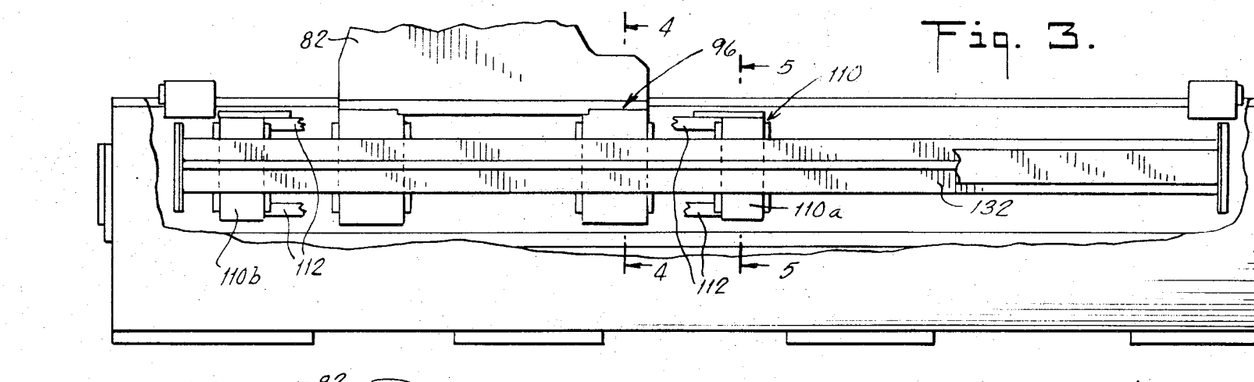
FIG. 3 is a broken-away view of a carriage unit and track mechanism for mounting the frame assembly for movement in a direction transverse to the pivotal axis of the frame assembly.

As noted above, the frame assembly 34 is mounted for transverse movement in the direction of the arrow 42 in FIG. 2, transverse with respect to the frame assembly pivot axis 40. This transverse movement, coupled with the pivotal movement of the frame assembly, permits complete tracking of the billet 20 by the frame assembly, and hence correct positioning of the drum 32 about the billet. As described above, the frame member 82 that mounts the shaft 80 that provides for pivotal movement of the assembly is in turn mounted on the carriage unit 96 (see FIG. 6). The carriage unit 96 is mounted for sliding movement along a track, to be described. The carriage unit 96 is positioned between a second carriage unit 110 which includes end pieces (plates) 110a and 110b. The end pieces are joined together by rods 112 which are spaced apart so as not to interfere with movement of the carriage unit 96 between the ends 110a and 110b of the second carriage unit (see also FIG. 3, which shows the details of the carriage units 96 and 110).

Referring again to FIG. 6, the carriage unit 96 which supports the frame member 82 is provided with a frame 114. Pneumatic bags 116 are employed to couple end plate 110b of the carriage unit 110 with end plate 114b of the frame 114. Similar pneumatic bags 118 are used to couple end plate 110a of the carriage unit 110 to end plate 114a of the frame that forms a part of the carriage unit 96. When the pneumatic bags 116 and 118 are inflated (they are shown inflated in FIG. 6) they serve to position the frame 114 and hence the carriage unit 96 substantially midway between the end pieces 110a and 110b of the carriage unit 110. The pneumatic bags 116 and 118 are normally left deflated during the tracking of a workpiece by the frame assembly, so as not to hinder movement of the frame assembly in tracking the workpiece.

Figure 4:
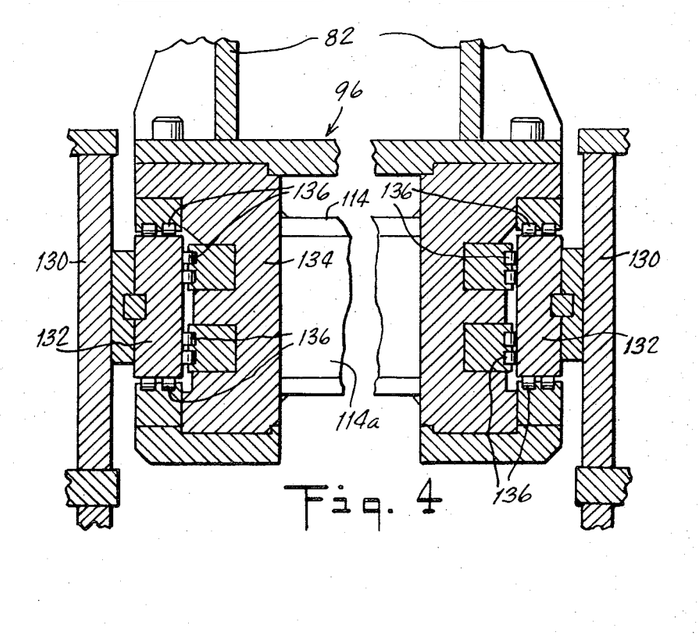
FIGS. 4 and 5 are sectional views, to an enlarged scale, taken along the section lines 4—4 and 5—5 in FIG. 3.
Figure 5:
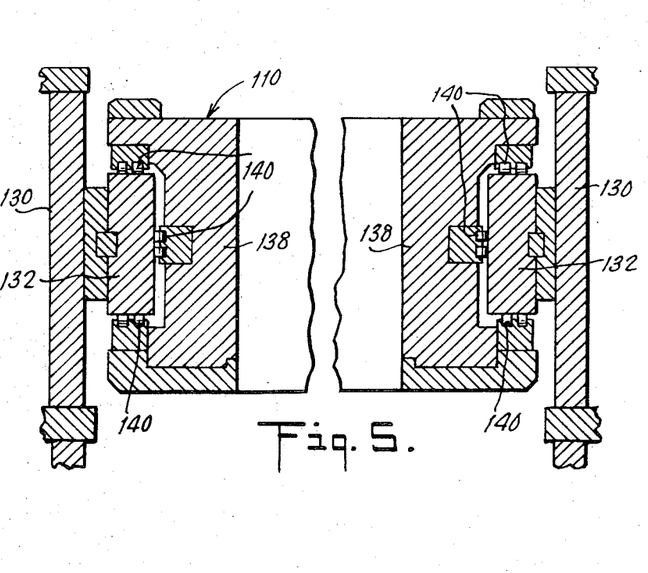

FIGS. 4 and 5 show the details of the track assembly upon which the carriage units 96 and 110 travel. As shown in these figures, the track assembly includes side pieces 130, which carry tracks 132. FIG. 4 shows how the carriage unit 96 is mounted for sliding movement along the tracks 132. The carriage unit 96 includes members 134 which carry rollers 136 thereon. Similarly, as shown in FIG. 5, carriage unit 110 includes members 138 on both sides thereof that carry rollers 140 to permit sliding of the carriage unit along the tracks 132.

Returning to FIG. 6, the end pieces 110a and 110b of the carriage unit 110 are connected to a chain 150 which passes about sprockets 152, 154, 156, 158 and 160. The sprocket 160 is driven by a chain 162 that in turn is driven by a sprocket 164 actuated by a motor 166. The motor 166 controls transverse movement of the entire frame assembly 34 with respect to the direction of the pivotal axis 40. The chain drive is normally used to position the frame assembly in operating and non-operating positions. In the operating position of the frame assembly 34, which is the position that the frame assembly assumes during operation for tracking of a workpiece, the pneumatic bags 116 and 118 are used for proper positioning of the frame assembly with respect to the rollers 24 that support the workpiece (FIG. 1). As noted above, the normal operation during actual tracking is to remove pneumatic pressure from these bags, to permit the frame assembly to move freely along the tracks 132. At the end of a particular test, due to a crookedness in a billet, the frame assembly may be somewhat out of a central position with respect to a new billet that is to be tested. The offcenter positioning of the frame assembly 34 is detected through use of an actuator 170 that is carried by frame member 82 (see FIGS. 2 and 2a). The actuator 170, in the center position of the frame assembly 34, is positioned between two switches 172 and 174. If the frame assembly 34 is positioned too much to the right in FIG. 2, the switch 172 will be actuated; conversely, if the frame assembly 34 is positioned too far to the left in FIG. 2, the switch 174 is actuated. The switches 172 and 174 control the application of air pressure to the pneumatic bags 116 and 118. When either of the switches 172 or 174 is actuated, and a test of a billet is about to begin (the billet is not yet contacted by the guide rollers 36 and 38), air pressure is supplied to both sides of pneumatic bags 116 and 118 causing a centering of the frame assembly 34 and a positioning of the actuator 170 between the switches 172 and 174. Thereafter, pneumatic pressure is removed from the bags. If, following a test, the frame assembly is in its center position, neither of the switches 172 nor 174 will be actuated and hence no pneumatic pressure will be supplied to the bags 116 and 118. This arrangement of activator and switches eliminates the needless pressuring of the pneumatic bags when the frame assembly is in its center position.

Rotating Drum 32

Figure 10:
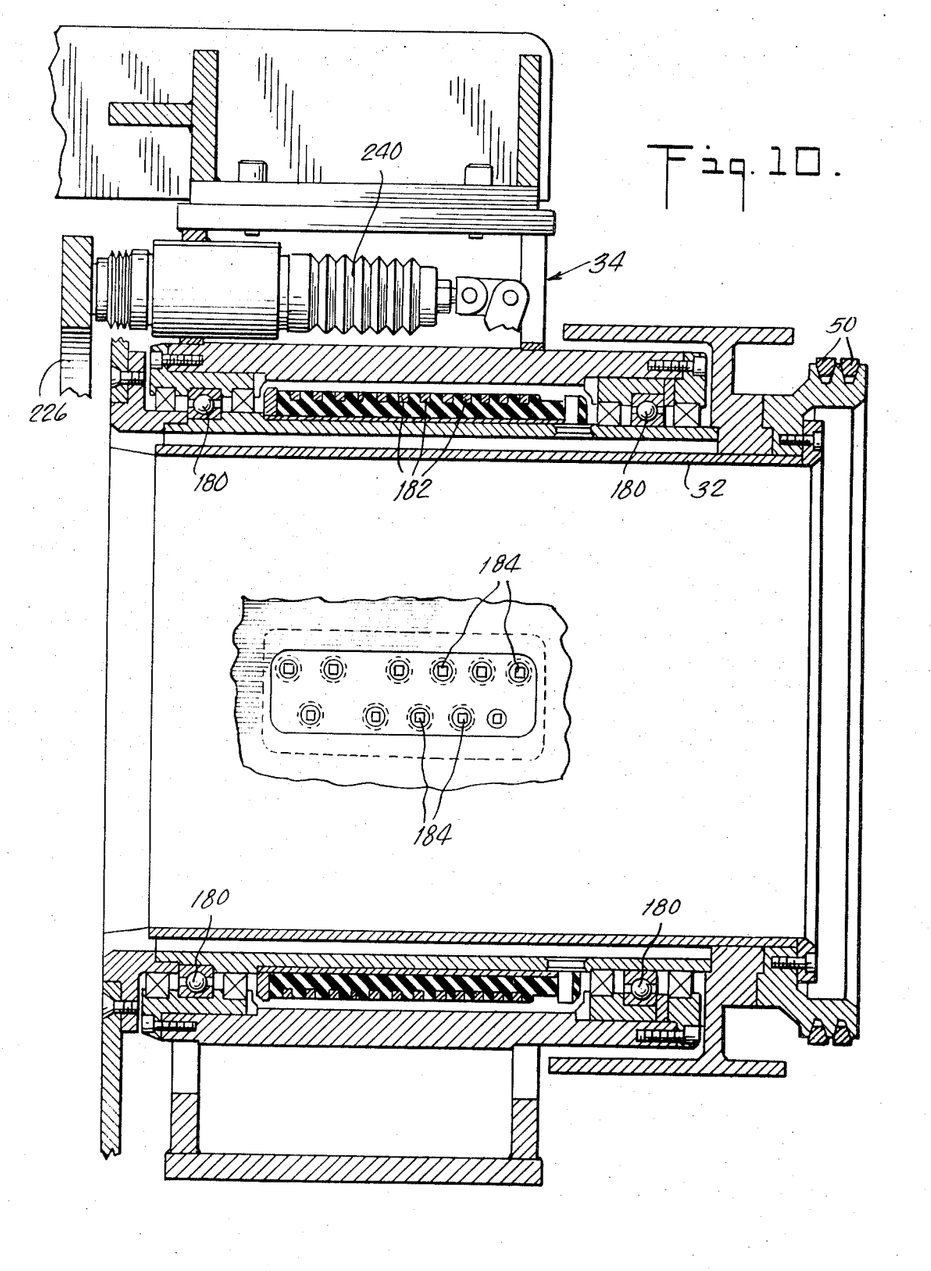
FIG. 10 is a sectional view of the rotating drum showing the details of the mounting of the drum to the frame assembly and the method of making electrical connection to the drum.

The drum 32 which carries the probe mechanism 44 and the paint marking device 46, referred to above, is shown in detail in FIG. 10. The drum is mounted for rotation within frame assembly 34 by means of bearings 180. Belt drive 50 is utilized, as explained above, to rotate the drum 32, and is in turn driven by motor 48, shown in FIG. 2. The drum 32 includes slip rings 182 in the periphery thereof which are contacted by brushes 184 carried in frame assembly 34. The brushes 184 make electrical contact with the slip rings 182 to provide for the transfer of electrical power between the rotating drum 32 and the frame assembly 34 which is stationary with respect to the rotating drum. Although there are a number of fluid functions in connection with the drum these functions are carried out by self-contained fluid-acting mechanisms, and hence the only connection between the rotating drum and the relatively fixed frame assembly is an electrical connection (aside from the mechanical connection by way of bearings and the like).

Figure 11:
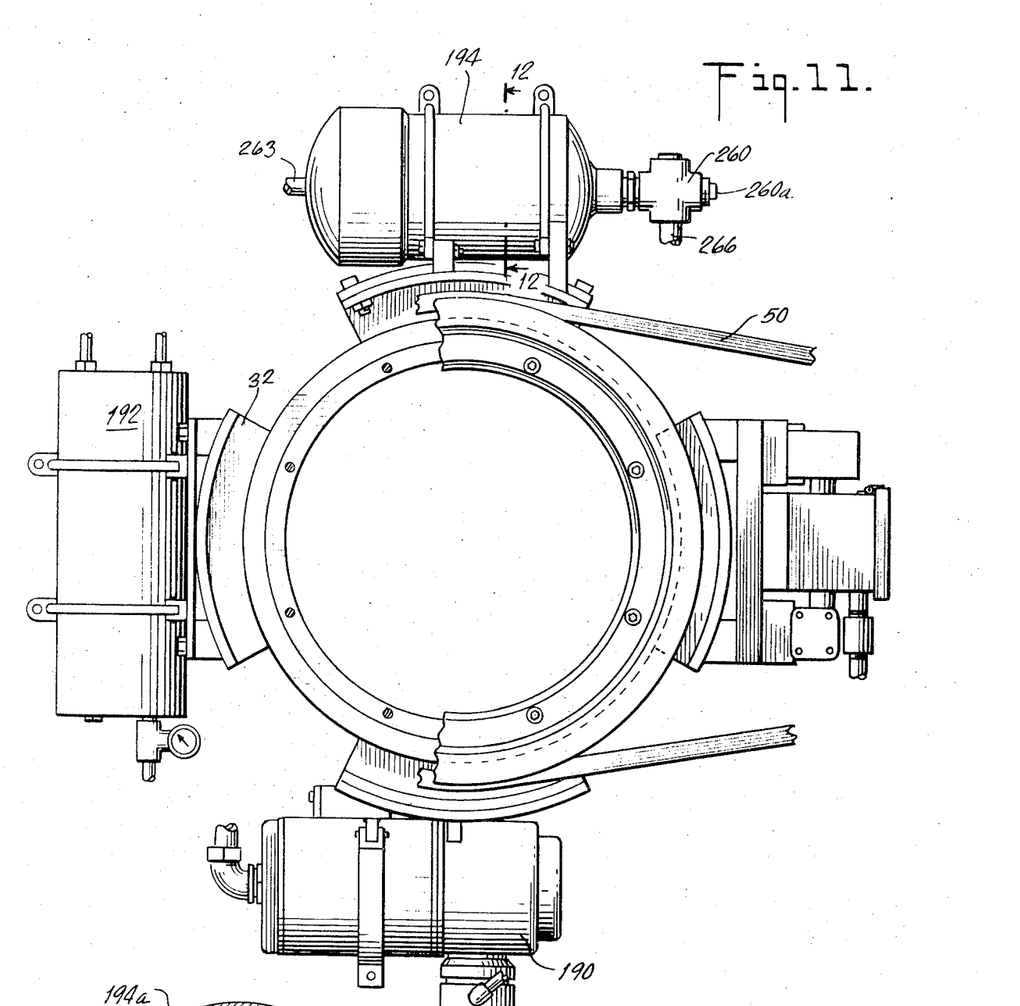
FIG. 11 is a view similar to FIG. 7, viewing the rotating drum from the side opposite from that shown in FIG. 7, and illustrating the mounting of self-contained fluid-acting mechanisms to the drum.

FIG. 11 shows some of the self-contained fluid-acting mechanisms that are mounted on the drum for rotation with the drum. As shown in FIG. 11, a pneumatic compressor 190, an air storage tank 192 and a paint accumulating tank 194 are all mounted on the drum 32. Each of these mechanisms is self-contained so that no fluid connections are needed between the rotating drum and the relatively fixed frame assembly 34. This positioning of self-contained fluid-acting mechanisms on a rotating drum is an important feature of this apparatus, greatly simplifying the construction and operation of the entire system.

Mounting of Probe Mechanisms 44 and Paint Marking Devices 46

FIG. 7 shows the details of the probe mechanisms 44 and paint marking devices 46 with respect to the mounting of these items on the rotating drum 32. There are two probe mechanisms and two paint marking devices, although the number is arbitrary.

Probe mechanism 44 is essentially the same as that described in the co-pending application Ser. No. 829,872 referred to above. It involves a probe carrier assembly having an arm structure 44a linked to rollers 44b. The rollers are articulated to each other and are adapted to travel about the periphery of the workpiece 20. A probe 44c is thus positioned against the workpiece as the drum 32 is rotated. The details of the probe mechanism 44 are unimportant for the purposes of the present invention.

The probe mechamism 44 is carried by an arm 200 that is fixed to a housing 202. The housing pivots about axis 204 and includes a counterweight 206 that balances the weight of the probe mechanism 44. The housing 202 is also joined to an arm 208 that is connected to a spring 210. The spring 210 may be a constant-force spring that urges the housing 202 in a counterclockwise sense so as to bias the probe mechanism 44 against the workpiece 20.

Movement of the probe mechanism 44 toward and away from the workpiece 20 is accomplished through a series of linkages coupling the housing 202 to an actuating arm 212. To explain, an arm 214 is attached to the housing 202 and is terminated in a pin 216 that is positioned within slot 218a of a further arm 218. The arm 218 is pivotally attached to a further arm 220 that is coupled to arm 212 through the mechanism of a gear box 222. The gear box 222 serves to provide a right-angled change of pivoting motion. The arm 212 is terminated in a roller 224 which is actuated by a non-rotating ring 226. The ring 226 is mounted to frame assembly 34 and is not part of the rotating drum 32. When the ring 226 is moved toward the roller 224 actuating that roller, the various arms just described cause the pin 216 to be moved in a clockwise sense with respect to the axis 204, thereby pivoting the probe mechanism 44c away from the billet under inspection. When the ring 226 is moved away from the roller 224, the biasing provided by the spring 210 causes the probe mechanism 44 to be pivoted in a counterclockwise sense with respect to the axis 204, so that the probe mechanism 44 is maintained in contact with the workpiece 20.

It should be noted that the slot 218a in the arm 218 permits movement of the pin 216 therein to accommodate variations in contour of the workpiece under inspection, permitting the probe mechanism to properly track the workpiece.

Figure 8:
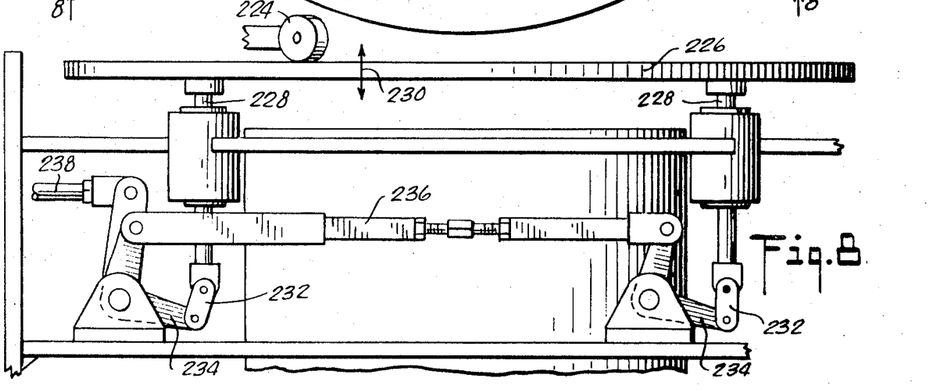
FIG. 8 is a view of part of the apparatus of FIG. 7, looking in the direction of the arrows 8—8 in FIG. 7.

FIGS. 8 and 9 show the details of the mounting of the ring 226. As just noted, the ring 226 is not part of the rotating drum assembly. The ring is carried by a plurality of shafts 228 which, when actuated, cause the ring to move in the direction of arrow 230 in FIG. 8. The shafts 228 may all be coupled together by linkages 232, 234 and 236, permitting actuation of all shafts 228 by a single actuating member 238. As shown in FIG. 9, the shafts 228 may be covered by a suitable flexible material 240, which prevents dirt from contaminating the shafts.

With respect to the paint marking devices 46, FIG. 7 shows how one of these devices is mounted. It is carried by an arm 242 which is not connected to the housing 202 and which is free to pivot about the axis 204. The arm 242 is actuated by a lug (not shown in FIG. 7) that forms a part of the housing 202, so that when the housing is pivoted about the axis 204 in a clockwise sense, the paint marking device 46 is also pivoted in a clockwise sense to move it away from an operating position with respect to a billet under inspection. The arm 242 includes an extension 242a that is coupled by a spring 250 to a lug 252. The spring 250 biases the paint marking device 46 toward the billet.

SUPPLY OF PAINT

Figure 12:
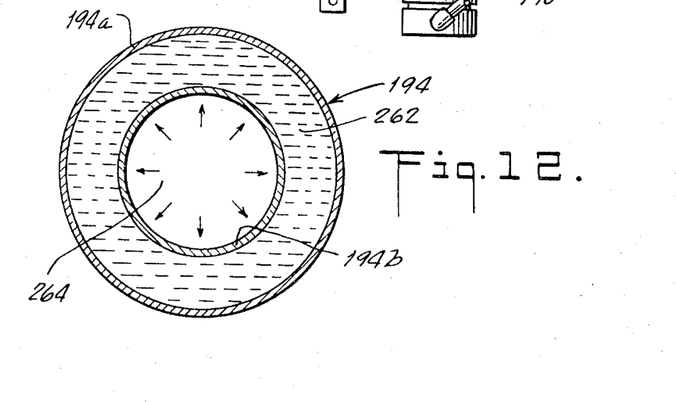
FIG. 12 is a sectional view of one of the self-contained fluid-acting mechanisms shown in FIG. 11 (a paint accumulating device) taken along the line 12—12 in FIG. 11.

As noted above in connection with the description of FIG. 11, the paint accumulating tank 194 is a self-containd unit which is mounted on the drum 32 and which rotates with that drum. This unit supplies paint to the paint marking devices 46 that are also mounted on the drum and which are used to mark the billet under inspection at those times when flaws are detected by the probe mechanism 44, also rotating with the drum. Paint is initially charged into the accumulating tank 194 through an inlet 260. The inlet is then closed by a cap 260a. The details of the accumulating tank are shown in FIG. 12. The tank comprises an outer rigid container 194a and an inner flexible container 194b. The outer rigid container 194a is typically made of steel, while the inner flexible container 194b may be of rubber, for example. Paint, designated 262 in FIG. 12, is supplied to the space between the rigid and flexible containers 194b and 194b (received from the inlet 260 described in connection with FIG. 11). Fluid pressure (from pressure inlet 263 in FIG. 11) is supplied to space 264 inside the flexible container 194b. The fluid pressure may be pneumatic, for example. The pressure inside the flexible container 194b pressurizes the paint 262. In FIG. 11, the paint outlet is designated 266 and this outlet communicates with the space between the rigid and flexible containers 194a and 194b. The paint outlet 266 is connected directly to the paint marking devices 46. (It should be noted from FIG. 6 that the drum 32 is grooved as at 32a to accommodate hydraulic lines, electrical conductors and the like passing from one part of the drum to another.)

By this paint supply system, paint is continuously supplied under pressure to the paint marking devices. A simple valve in the paint marking devices controls the flow of paint therefrom onto the workpiece 20. No gaps or voids in the supply of paint are present by this constant pressure paint supply system, facilitating the marking of the workpiece due to flaws.

Method of Operation

The apparatus described above is generally operated according to the following sequence:

1. The upstream sensors (sensors 28 in FIG. 1) sense the leading end of a workpiece (billet 20) as it moves within a first zone (to the left of guide roller 36 in FIG. 1) in position to pass through the drum 32 and in response thereto: (a) the guide rollers 36 and 38 (FIG. 2) are pivoted downwardly to their operating positions (by action of the piston 60 in FIG. 1 moving to the left under the action of the cylinder 62); and (b) frame assembly 34 in FIG. 2 is pivoted in a clockwise sense about the axis 40 through the action of cylinder 84 and piston 86 (FIG. 6) until the guide rollers 36 and 38 engage the workpiece, whose leading end is now in position beneath the guide rollers. A slight biasing of the piston 86 toward the left is provided to bias the frame assembly 34 so that the guide rollers 36 and 38 continuously engage the workpiece during a test.

2. The downstream sensors (sensors 30 in FIG. 1) sense the position of the leading end of the workpiece within a second zone (to the right of the testing assembly 26 in FIG. 1) and in response thereto: (a) the probe mechanisms 44 are moved into a testing postion in engagement with the workpiece 20 (the paint marking devices are also moved into an operating position near the workpiece) by action of the ring 226 in FIG. 8 moving away from the rollers 224; and (b) the drum 32 is rotated, thereby to cause the probe mechanisms 44 to move about the periphery of the workpiece as the workpiece moves through the drum. The probe mechanisms thus follow a helical path about the workpiece and scan the workpiece for flaws.

3. The passage of the trailing end of the workpiece through the first zone is sensed by the sensors 28 in FIG. 1, and in response thereto: (a) rotation of the drum 32 is stopped; (b) the probe mechanisms 44 and paint marking devices 46 are moved to non-operating positions by the action of the ring 226 in FIGS. 7 and 8 moving into engagement with the rollers 224; and (c) the yieldable biasing of the frame assembly 34 in a clockwise sense is removed by removing the pressure in cylinder 84 in FIG. 6, so that the frame assembly 34 may "float" in its last position and not move from that position when the trailing end of the workpiece passes out of engagement with the guide rollers 36 and 38.

4. The passage of the trailing end of the workpiece through the second zone is sensed by the sensors 30 in FIG. 1, and in response thereto: (a) the frame assembly 34 is pivoted counterclockwise by movement of the piston 86 to the right in FIG. 6; (b) the guide rollers 36 and 38 are raised upwardly (piston 60 moves to the right in FIG. 1); and (c) air pressure is supplied to the pneumatic bags 116 and 118 to center the testing assembly in the event that the actuator 170 shown in FIG. 2 is not in position between the centering switches 172 and 174.

SUMMARY

The methods and apparatus disclosed above provide for the inspection of a workpiece. The use of a rotating drum which carries self-contained fluid-acting mechanisms facilitates construction and operation of the apparatus due to the requirement that only electrical connections need be made to the drum, obviating the need for complicated fluid connections. The drum is mounted not only for rotation, but also for pivoting movement about an axis and for movement in a direction transverse to the pivoting axis, so as to allow a workpiece that passes through the drum to be properly tracked regardless of changes in the shape of that workpiece. It will be obvious that modifications of the apparatus and methods disclosed are possible. Accordingly, the invention should be taken to be defined by the following claims.

We claim:

1. A test assembly for scanning a workpiece, comprising a drum within which a workpiece may be positioned, a frame assembly which mounts the drum for rotation therein, means for rotating the drum about the workpiece, one or more probe mechanisms carried by the drum and adapted to bear against the workpiece so as to scan the workpiece as the drum is rotated, means for moving the probe mechanisms between workpiece contacting and non-contacting positions, said moving means comprising a roller, a linkage coupling together the roller and a corresponding probe mechanism to cause movement of the corresponding probe mechanism between said workpiece contacting and non-contacting positions upon movement of the roller between first and second positions, and a ring attached to the frame assembly and bearing against the roller and mounted for movement to move the roller between said first and second positions and cause corresponding movement of the corresponding probe mechanism between said workpiece contacting and non-contacting positions.

2. A test assembly for scanning a workpiece, comprising a drum carrying one or more probes for completing a test and within which a workpiece may be positioned, means for rotating the drum about the workpiece comprising a frame assembly which mounts the drum for rotation therein, the frame assembly being pivotally mounted about an axis substantially parallel to the axis of rotation of the drum to enable the drum to be selectively positioned with respect to the workpiece under test, said frame assembly including a part thereof on the side of said axis opposite from said drum and counterbalancing the weight of said drum to balance the frame assembly about said axis enabling the frame assembly to remain in any one of a plurality of angular positions.

3. Apparatus according to claim 2, including one or more guide rollers mounted to the frame assembly to bear against the workpiece for positioning the frame assembly and hence the drum with respect to the workpiece.

4. Apparatus according to claim 3, including biasing means for yieldably biasing the frame assembly in position with the guide rollers against the workpiece.

5. Apparatus according to claim 4, in which the workpiece is moved through the drum, and including sensing means responsive to the passage of the workpiece through a predetermined zone for removing the biasing of the frame assembly to permit said frame assembly to be balanced and remain in its position prior to removal of biasing.

6. A test assembly for scanning a workpiece, comprising a drum within which a workpiece may be positioned, means for rotating the drum about the workpiece comprising a frame assembly which mounts the drum for rotation therein, the frame assembly being pivotally mounted about an axis substantially parallel to the axis of rotation of the drum so that the drum may be selectively positioned with respect to the workpiece under test, the frame assembly being mounted upon a first carriage unit, a track upon which the first carriage unit moves to render the frame assembly movable in a direction substantially perpendicular to said axes, a second carriage unit movable upon the track, the second carriage unit limiting the movement of the first carriage unit, and means yieldably coupling the first and second carriage units together.

7. A test assembly for scanning a workpiece, comprising a drum within which a workpiece may be positioned, means for rotating the drum about the workpiece comprising a frame assembly which mounts the drum for rotation therein, the frame assembly being pivotally mounted about an axis substantially parallel to the axis of rotation of the drum so that the drum may be selectively positioned with respect to the workpiece under test, the frame assembly being mounted upon a first carriage unit, a track upon which the first carriage unit moves to render the frame assembly movable in a direction substantially perpendicular to said axes, a second carriage unit movable upon the track, the second carriage unit comprising first and second end pieces spaced apart from each other along the track and between which is positioned the first carriage unit to limit the movement of the first carriage unit, and pneumatic bags coupling the end pieces to the first carriage unit so as to yieldably couple the first and second carriage units together.

8. Apparatus according to claim 7, including means responsive to the position of the frame assembly within a predetermined zone for removing pneumatic pressure from within the bags.

9. Apparatus according to claim 7, including means responsive to the position of the frame assembly outside a predetermined zone for supplying pneumatic pressure to the bags.

10. A method of scanning a moving workpiece such as a billet by a test mechanism that includes a rotatable drum through which the workpiece passes, the drum carrying one or more probe mechanisms that are adapted to scan the workpiece as the drum is rotated, a frame assembly which mounts the drum, the frame assembly itself being pivotally mounted and including one or more guide rollers mounted thereto which may bear against the workpiece for positioning the frame assembly and hence the drum and probe mechanism with respect to the workpiece, comprising the steps of:
  1. sensing the leading end of the workpiece as it moves within a first zone in position to pass through the drum and in response thereto:
    a. pivoting the frame assembly until the guide rollers engage the workpiece and
    b. yieldably biasing the frame assembly in position with the guide rollers against the workpiece;
  2. sensing the position of the forward end of the workpiece within a second zone and in response thereto:
    a. moving the probe mechanisms into a testing position, and
    b. rotating the drum and hence the probe mechanisms so as to scan the workpiece as the workpiece moves through the drum;
  3. sensing the passage of the trailing end of the workpiece through the first zone and in response thereto:
    a. ceasing rotation of the drum;
    b. moving the probe mechanisms to a non-testing position; and
    c. removing the yieldable biasing of the frame assembly and causing the frame assembly to remain substantially in its last position; and
  4. sensing the passage of the trailing end of the workpiece through the second zone and in response thereto pivoting the frame assembly to a non-operating position.

11. A method according to claim 10, including providing for movement of the frame assembly in a direction substantially transverse to the direction of movement of the workpiece through the drum so as to permit the frame assembly and hence the drum to track the workpiece.

12. A method of scanning a moving workpiece by a test mechanism that includes a rotatable drum through which the workpiece passes, the drum carrying one or more probe mechanisms that are adapted to scan the workpiece as the drum is rotated, comprising the steps of:
  1. rotating the drum as the workpiece moves therethrough so as to scan the workpiece by the probe mechanisms;
  2. pivotally moving the drum about a pivot axis so that the axis of rotation of the drum bears a predetermined relation to the workpiece passing through the drum; and
  3. moving the drum as the workpiece moves therethrough in a direction substantially transverse to said pivot axis to maintain said predetermined relation.

* * * * *